US009677895B2

(12) United States Patent
Schulz

(10) Patent No.: US 9,677,895 B2
(45) Date of Patent: Jun. 13, 2017

(54) METHOD FOR OPERATING A NAVIGATION SYSTEM IN A VEHICLE AND CORRESPONDING CONTROL SYSTEM AND COMPUTER PROGRAM PRODUCT

(71) Applicant: Bayerische Motoren Werke Aktiengesellschaft, Munich (DE)

(72) Inventor: Ralf Schulz, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/015,459

(22) Filed: Feb. 4, 2016

(65) Prior Publication Data

US 2016/0153792 A1     Jun. 2, 2016

Related U.S. Application Data

(63) Continuation of application No. PCT/EP2014/066366, filed on Jul. 30, 2014.

(30) Foreign Application Priority Data

Aug. 7, 2013    (DE) .................. 10 2013 215 499

(51) Int. Cl.
*G01C 21/00*     (2006.01)
*G06F 13/362*    (2006.01)
*G01C 21/34*     (2006.01)
*G01C 21/36*     (2006.01)
*G08G 1/0968*    (2006.01)

(52) U.S. Cl.
CPC ......... *G01C 21/34* (2013.01); *G01C 21/3697* (2013.01); *G06F 13/362* (2013.01); *G08G 1/096827* (2013.01)

(58) Field of Classification Search
CPC ... G01C 21/34; G01C 21/3697; G06F 13/362; G08G 1/096827
See application file for complete search history.

(56) References Cited

U.S. PATENT DOCUMENTS 6,389,332 B1   5/2002   Hess et al.
6,442,484 B1   8/2002   Miller et al.
(Continued)

FOREIGN PATENT DOCUMENTS

DE       199 19 216 A1     11/2000
DE          10301608 A1 *   7/2004
WO    WO 2012/143073 A1    10/2012

OTHER PUBLICATIONS

"Bandwidth Manager: ClearOS User Guide," Jan. 10, 2013, URL: http://web.archive.org/web/20130110012333/http://www.clearcenter.com/support/documentation/user_guide/bandwidth_manager, XP055149587 (four (4) pages).
(Continued)

*Primary Examiner* — Michael J Zanelli
(74) *Attorney, Agent, or Firm* — Crowell & Moring LLP

(57) ABSTRACT

In order to operate a navigation system in a vehicle where navigation data of the navigation system are transferred to at least one of a plurality of control devices of the vehicle, wherein the data is transferred via at least one data bus to which the control devices are connected, the navigation data are prioritized, and the transfer of the navigation data via the data bus is controlled on the basis of the prioritization.

20 Claims, 1 Drawing Sheet

(56) References Cited

U.S. PATENT DOCUMENTS

| | | | |
|---|---|---|---|
| 6,704,646 B2* | 3/2004 | Cochlovius | G01C 21/3667 |
| | | | 701/454 |
| 7,184,871 B2* | 2/2007 | Horbaschek | B60R 16/0315 |
| | | | 701/29.6 |
| 7,584,029 B2* | 9/2009 | Legate | G07C 5/008 |
| | | | 701/31.4 |
| 2002/0138180 A1* | 9/2002 | Hessing | G08G 1/0969 |
| | | | 701/1 |
| 2007/0093958 A1 | 4/2007 | Jonsson et al. | |
| 2013/0219039 A1* | 8/2013 | Ricci | G06F 3/0484 |
| | | | 709/223 |
| 2016/0028868 A1 | 1/2016 | Scholz et al. | |

OTHER PUBLICATIONS

International Search Report (PCT/ISA/210) issued in PCT Application No. PCT/EP2014/066366 dated Mar. 2, 2015 with English-language translation (nine (9) pages).
German-language Written Opinion (PCT/ISA/237) issued in PCT Application No. PCT/EP2014/066366 dated Mar. 2, 2015 (twelve (12) pages).
German Search Report issued in counterpart German Application No. 10 2013 215 499.2 dated Mar. 6, 2014 with partial English-language translation (thirteen (13) pages).

\* cited by examiner

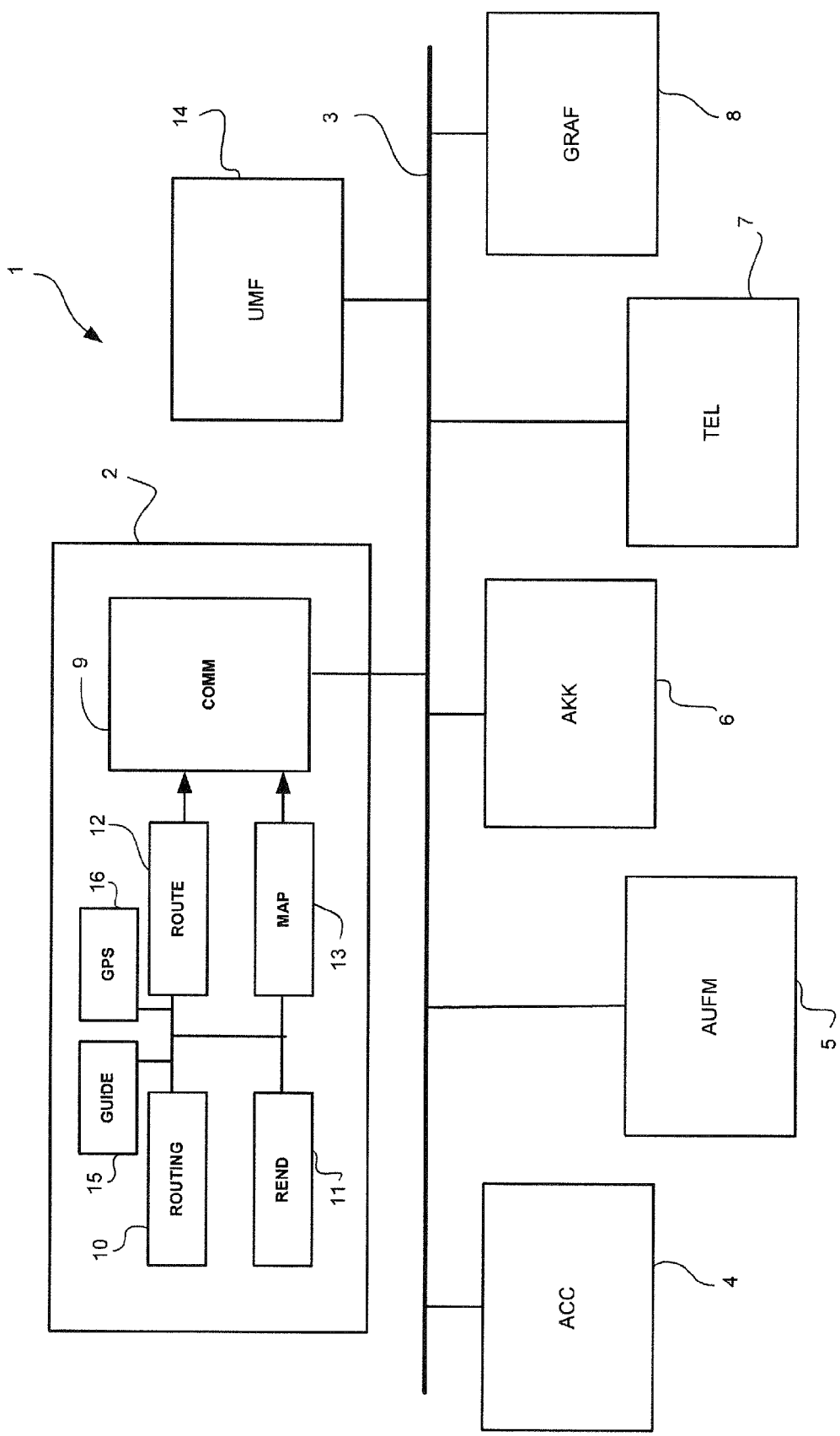

METHOD FOR OPERATING A NAVIGATION SYSTEM IN A VEHICLE AND CORRESPONDING CONTROL SYSTEM AND COMPUTER PROGRAM PRODUCT

CROSS REFERENCE TO RELATED APPLICATIONS

This application is a continuation of PCT International Application No. PCT/EP2014/066366, filed Jul. 30, 2014, which claims priority under 35 U.S.C. §119 from German Patent Application No. 10 2013 215 499.2, filed Aug. 7, 2013, the entire disclosures of which are herein expressly incorporated by reference.

BACKGROUND AND SUMMARY OF THE INVENTION

The invention relates to a method for operating a navigation system in a vehicle and to a corresponding control system and a corresponding computer program product.

Vehicle navigation systems usually have the following components:

Routing

This component controls the planning of a route from a starting point to a destination via a plurality of possible waypoints.

Guidance

This component controls the guidance of the driver with respect to the planned route; this also includes the voice output of turn instructions, the display of arrows in a display device, for example a combination instrument or a head-up display. The guidance component ensures, in particular, that image representations of driving maneuvers, for example lane changes or turning, are provided for the different display media. The guidance component generally likewise directly ensures voice output.

Positioning

This component is used to control the positioning of the vehicle, for example using Global Positioning System (GPS) data.

Map Data

This component includes the map data and the handling and processing of said data. The latter may be stored locally in the vehicle. Map data may also be loaded into the vehicle navigation system from a storage medium or from an external source, for example a central data server, and possibly updated.

Map Viewer

This component is used to control the map display.

The present patent application relates, in particular, to the two components of map data and guidance. These components are generally very closely meshed. This is caused by the large volumes of data stored in the map. The amount of map and route data which need to be transmitted between the respective components for specific guidance to a destination is also generally relatively large. Therefore, on the basis of conventional bus systems with limited bandwidth, these data generally cannot be transmitted as a unit.

The object of the invention is to make it possible to efficiently transmit navigation data for operating a navigation system in a vehicle.

This and other objects are achieved by a method, control system and computer program provided in accordance with embodiments of the invention.

In order to operate a navigation system in a vehicle, a first aspect of the invention provides for navigation data from the navigation system to be transmitted to at least one of a plurality of control apparatuses of the vehicle. In this case, provision is also made for the data to be transmitted via at least one data bus to which the control apparatuses are connected, the navigation data to be prioritized, and for the transmission of the navigation data via the data bus to be controlled on the basis of the prioritization.

The invention may provide, in particular, for higher-priority data to be given preference over lower-priority navigation data during transmission, for example by way of a wider bandwidth provided on the at least one data bus and/or by way of shorter waiting times before transmission. A control apparatus may include, as control components, software components and/or electronic hardware components, in particular.

The invention is based on the knowledge that only a certain minimum throughput can be guaranteed on a data bus for transmitting route and map data, but free capacities on the bus can be used to achieve a higher throughput. It was also recognized that, for a guaranteed minimum throughput in bus systems, a predefined data volume or number of data frames can sometimes be reserved at regular intervals for an application. Prioritizing the navigation data makes it possible to at least partially reserve a minimum throughput for the prioritized data. The further available data volumes or data frames can then be used for other applications and/or lower-priority data.

The invention also recognized that it is possible to transmit complex or comprehensive navigation data with a dynamic bandwidth and with a relatively low guaranteed minimum throughput without having to effect a restriction to individual messages, that is to say selected related blocks of the navigation data. In the case of such a restriction which exists in conventional systems, simple messages are forwarded, for example in how many meters the next turning maneuver will be effected. The message catalog used in this case is very small and every new required event requires a change to the navigation system. Larger messages, for example relating to the route guidance, are normally transmitted only on request in such conventional systems. This means that every involved control component which requires this information must separately request it, which costs bandwidth, and must simultaneously be connected to the navigation system via a heavy-duty bus. In order to eliminate this problem and increase the available bandwidth, the present invention makes it possible, in particular, to achieve the situation in which the necessary map and route information is transmitted, together with data relating to the current position and/or speed, to all connected control components in a type of compressed form, with the result that an independent evaluation can be carried out in each connected control component. In this case, provision may be made, in particular, for the navigation data to be transmitted to a plurality of users and, in particular, to all users of the data bus(es) by broadcast.

A plurality of data buses may be provided, in particular, for transmitting the navigation data. In this case, a more powerful data bus, for example a Media Oriented Systems Transport (MOST) bus, can be provided for transmitting data between control components having higher data throughputs. In this case, control components may be components of the navigation system and/or of the respective control apparatuses of the vehicle. A less powerful data bus, for example a Controller Area Network (CAN) bus, may be provided for transmitting data between control components with lower data throughputs. An Ethernet network connection may also be provided as the data bus. The type of control may remain the same for the various data buses. The control component which respectively distributes the data can be started several times, for example if the storage sizes for connected devices differ. For example, control components which need to know only a few maneuvers, in particular only the next maneuver, within a predefined period and/or until the next maneuver message and accordingly can store only a few maneuver messages, in particular only one maneuver message, can be connected to a CAN bus. Conversely, a higher limit and/or an unlimited number of messages which can be transmitted and/or stored in a control component may be provided for a more powerful data bus, for example a MOST data bus. This function can be provided, in terms of programming, by instantiating the control component for data forwarding, for example. In this case, there is no need, in particular, to specifically configure which messages are intended to be transmitted.

In particular, the prioritization according to the invention of the navigation data makes it possible for these data to be interchanged between different control apparatuses and, in particular, between their control program modules in a modular control system. This also makes it possible to provide an open system in which further control apparatuses or control program modules can be connected, for example via an open interface (Application Programming Interface, API), without adapting existing control apparatuses.

The invention also makes it possible to reduce the data volume for the navigation data to be transmitted via the data bus and to compress the data and, as a result, avoid overloading of the data bus. In particular, corresponding data compression can be enabled by using the following features:

Only a relatively small part of the map data is needed for the route guidance or the other scenarios, namely only those which are in the immediate vicinity of the route. Only details of junctions are substantially required.

Route data substantially comprise maneuver data relating to the maneuvers of turning, driving straight ahead, changing road and/or additional information relating to lanes, traffic signs, speed or road type, for example.

Events are all the more important, the more imminent they are. For example, the next 500 meters are more important than events in 200 kilometers.

For some scenarios, there is no need to guarantee that they are always available, that is to say that they are also available in emergency situations in which the bus load may be high and loading by low-priority processes is unfavorable, for example scenarios relating to the comparison of map data or the interchanging of update data with a central server or a telematics module.

The data relating to the route can be hierarchically organized along different axes, for example according to up-to-dateness, level of detail, for example number of lanes at a junction, inscriptions on traffic signs, etc.

No GPS position is required for route tracking; the route can be represented as a linear section, in particular, and the current position along the route can then be coded using a single number, in which case a special, predefined number can be used to indicate that the route has been left.

The route is relatively static and changes only when the driver leaves the route or a traffic event makes replanning necessary. In the first case, the route changes, in particular, only locally at the currently traveled location but not further away; in the second case, the route changes, in particular, further away, possibly even the entire route.

The invention makes it possible to provide for the navigation data to be provided in machine-readable form. In this context, machine-readable means, in particular, a sequence of binary-coded data or text in the Extensible Markup Language (XML) format or a corresponding electronically readable, in particular non-proprietary data format.

The navigation data may include, in particular, one or more sets of the following data:
  type of a maneuver (turning, driving onto a freeway, taking an exit, etc.),
  distance to the maneuver and/or position of the maneuver (for example coded as GPS coordinates),
  lane in which the maneuver can be carried out,
  general description of the roads involved at the location of the maneuver (what type of road, what maximum speed, how many lanes, what exits before and after, what type of intersection, etc.),
  a representation of the type of intersection which is coded as vector graphics and can be adapted by display devices, in particular in the case of complex road courses,
  information relating to additional displays (road signs, place names, direction arrows) which point in the direction of the maneuver or in the other directions.

It may be useful to transmit or output a plurality of these sets when a plurality of maneuvers closely follow one another, for example.

According to one advantageous exemplary embodiment of the invention, data relating to the current geographical position and relating to the current speed are given a higher priority than maneuver data and geographical data relating to a route.

According to another advantageous exemplary embodiment of the invention, a minimum throughput is reserved on the data bus for transmitting the navigation data, and the minimum throughput is used to transmit the data in the prioritization order. In this case, the minimum turnover corresponds to a predefined data volume or a number of data frames within a predefined time window and is newly allocated on the data bus at regular intervals of time. The following high-priority navigation data or navigation messages may be provided, in particular, for the minimum throughput, a navigation message comprising a plurality of items of navigation data, in particular:
  current geographical position, in particular current GPS position,
  current speed, and/or
  current position with respect to a traveled route.

The minimum throughput may contain a predefined maximum data volume for low-priority navigation data and/or navigation messages which are assigned a lower priority than the high-priority navigation data. For example, a maximum of two elements in the form of low-priority messages may be provided. A priority value may be allocated to an entire navigation message and then applies to all navigation data in this navigation message. Accordingly, provision may be made for low-priority navigation data or messages to be transmitted on the data bus(es) only if there is sufficient bandwidth available.

A low-priority navigation message may comprise a plurality of partial messages with the following contents:
  current relative position within a stipulated route in a geographical distance dimension,
  type of maneuver at the current position, and/or
  further information relating to the current position and/or relating to its environment.

Low-priority navigation data may be, in particular, route data which can be processed as follows:
- route parts which have already been traveled through are independently deleted by the connected control devices,
- only changes and route parts which have not yet been transmitted are transmitted,
- navigation data which relate to an earlier position on the route have priority over data with a lower position,
- parts of the route which have not been changed are transmitted again only when more than a particular number of bytes have been transmitted since their last transmission, and/or
- the data relating to the next maneuver are always concomitantly transmitted with the minimum throughput if this maneuver has not already been carried out and/or if the distance to this maneuver is shorter than a particular number of meters.

In one advantageous embodiment of the invention, the navigation data are output only once to the at least one data bus and/or a further data bus by the navigation system within a predefined output time window. The navigation data can be output to the data bus(es) in the order of their assigned hierarchy within the output time window. At least one of the control apparatuses of the vehicle connected to the data bus(es) can store the navigation data output only once to the data bus(es) within the output time window for a predefined period and/or in a list with a limited storage size.

Navigation data generated in succession may be stored, in particular, in a navigation data list and the control apparatuses and/or control program modules may retrieve the navigation data. This makes it possible for a queue of the maneuver information to be provided and to be regularly queried by control components, that is to say so-called polling is carried out.

When outputting the navigation data, the navigation system may output, in particular, a report stating that data have been output. In this case, reference data relating to control apparatuses and/or control program modules may be stored or may have been stored in an output list. The navigation system can then use the reference data to inform the respective control apparatuses and/or control program modules of the respective output of the navigation data. The corresponding notification report can be effected using a communication means, in particular physically using the data bus(es), by means of a logical connection and/or by activating (so-called triggering) the respective control apparatus. A corresponding list of control program modules involved can be determined at the runtime or the compiler time. The control apparatus or its control program module can respectively wait for the trigger information (so-called listening). An activated control apparatus can access the navigation data, in particular after triggering. The navigation system can also forward maneuver information in machine-assessable form to other control systems of the vehicle without itself assessing the information beforehand. This makes it possible to further reduce the data volume to be transmitted. In addition, the security of the entire control process can be increased because, for example, the tasks the navigation system can be restricted substantially to navigation tasks and the entire control system, including the vehicle control apparatuses, can have a modular structure. This is advantageous, in particular, in a software-supported implementation.

The reference data may indicate, in particular, what type of navigation data (for example maneuver, position, etc.) are assigned to the respective control apparatus. The navigation data may be at least partially provided as category data, at least one of the following categories being provided:
- an imminent driving maneuver,
- a driving maneuver which has been carried out,
- a measured value,
- a report.

The control apparatus may be connected, in particular, to at least one vehicle sensor which records vehicle states, for example a steering angle sensor and/or a speed sensor. Measurement data from the vehicle sensor can then be transmitted to the navigation system, in particular via the data bus(es). The positioning on the map, for example, can then be carried out using acquired vehicle data, for example steering angle and speed.

According to one advantageous exemplary embodiment of the invention, the guidance component is connected to at least one vehicle sensor directly and/or via the data bus. It is therefore possible, in particular,
- to output a warning if proposed driving maneuvers (turning maneuvers, etc.) are not carried out or are not carried out in good time,
- to compare map data such as signposts (turning instructions, place-name signs, street names) and speed limits with the actual conditions if detected by the vehicle sensor, for example using a camera mounted on the vehicle,
- to inform vehicles in the surrounding area and/or a back-end server of imminent driving maneuvers via possible wireless car-to-car or car-to-X connections,
- to automatically operate turn signals and the steering wheel and, in particular, to autonomously drive the vehicle,
- to evaluate information relating to the temporal coordination of driving maneuvers for an alertness assistant of the vehicle,
- to report deviations of the map data to a back-end server,
- to carry out adjustments for people with disabilities or, for example, with age-related restrictions or according to individual wishes without changing the navigation system, for example to indicate a maneuver using more conspicuous indications and/or earlier than usual. In addition, the indication may be effected on further displays (for example in the rear seat), maneuvers can be indicated using further indications (for example with lights inside the vehicle) and/or further acoustic and optical signals can be emitted during particular maneuvers, and/or
- to automatically reduce the speed before turning maneuvers for an automatic cruise control (ACC) system.

In another aspect of the invention which can be used together with or independently of the aspects of the invention described above, maneuver data for carrying out a driving maneuver at a maneuvering location are output by a navigation system. At least one vehicle sensor and position data provided by the navigation system are used to check, even before reaching the maneuvering location, whether the maneuver has been initiated with the vehicle. A report is output if the maneuver has not been initiated.

In another aspect of the invention which can be used together with or independently of the aspects of the invention described above, maneuver data for carrying out a driving maneuver at a maneuvering location are output by a navigation system. At least one vehicle sensor, for example a camera, and position data provided by the navigation system are used to check whether navigation data stored in the navigation system, for example signs pointing the way, match corresponding data recorded by the vehicle sensor in the vehicle environment. The navigation data are adapted to the recorded data, in particular in the navigation system and/or in a central back-end server which can be connected to the latter via a mobile radio connection for example, if there is a discrepancy.

In another aspect of the invention which can likewise be used together with or independently of the aspects of the invention described above, a control apparatus of a vehicle is connected to at least one vehicle actuator which changes a vehicle state, for example an ACC actuator, and/or to a graphical, acoustic and/or haptic data output device of the vehicle, for example a combination instrument, a steering wheel vibrator, a car-to-car transmitter/receiver, a telematics system and/or, in particular, a mobile radio card. Maneuver data for carrying out a driving maneuver at a maneuvering location can be output by the navigation system, and position data provided by the navigation system can be used to output control signals to the vehicle actuator.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE is a schematic block diagram of an open system structure having a navigation system.

DETAILED DESCRIPTION OF THE DRAWINGS

In the control system 1 of a motor vehicle, as illustrated in the FIGURE, a navigation system 2 is connected, via a data bus 3, to a plurality of control apparatuses of the motor vehicle, namely an ACC controller 4, an alertness assistant 5, an acoustic output apparatus 6 which can be used to output voice signals (voice guidance), and a telematics device 7 which comprises a mobile radio card and can use it to establish a connection to a central computer (back-end). The back-end computer can be connected to a multiplicity of vehicles using data technology and can collect data from the vehicles and can provide the vehicles with data, for example current traffic reports. A graphical output apparatus 8 of the vehicle is also connected to the data bus 3 and includes, for example, a display in the vehicle, such as a combination instrument, a head unit or a head mounted display. An environment detection apparatus 14 of the vehicle is also connected to the data bus 3 and includes, for example, a digital camera and an image processing unit which can be used to detect traffic signs.

The navigation system 2 contains a data interface 9 which can output navigation data and, in particular, maneuver data to the data bus 3 and can read in data from the data bus 3, for example data provided by the environment detection apparatus 14. The data interface 9 can provide the data bus 3 with navigation data, in particular in compressed form, the control apparatuses 4, 5 etc. of the vehicle reading out the navigation data if necessary as listeners and using said data for control tasks inside the vehicle. For this purpose, the data interface 9 may contain a corresponding list which indicates which vehicle control apparatus processes which maneuver data. The data interface 9 can also actively and directly inform the respective vehicle control apparatuses if corresponding navigation data are available therefor. The list of affected vehicle control apparatuses in the data interface 9 can be changed and, in particular, can be loaded into the navigation system 2 via the data bus or via a further interface, for example a Universal Serial Bus (USB) interface.

The navigation system 2 also includes the parts for the route planning (routing) 10, the route guidance (route) 12, the map data 13, the guidance 15 and the GPS positioning 16 already described at the outset and a component 11 for the rendering process and a corresponding component for the map display (map viewer).

The application scenarios which can be used, for example, with such a navigation system 2 or else another navigation system are described below:

Scenario 1: Warning if Driving Maneuvers are not Initiated

The navigation system announces a maneuver, for example "Turn right in 200 m from the two-lane country road at 100 km/h to a single-lane village road which allows only 50 km/h 150 m after the turn". The vehicle detects, for example using a vehicle sensor and a vehicle control apparatus, that the vehicle is currently being driven in the left-hand lane and the turn signal has not been set. A warning signal is therefore initiated at a distance of 150 m from the turn. This may consist of:
  a voice announcement, for example "Please change to the right-hand lane",
  a vibration of the steering wheel, and/or
  a warning display in the head-up display, head unit (central information display, CID) and/or combination instrument.

Scenario 2: Compare Map Data

The navigation system announces a maneuver, for example "Leave the A8 in 3 km at the first exit and drive onto the B471". The camera in the vehicle is used to detect signposts and that the following data are on the signposts on the freeway:
  exit number 78
  B471 and B2
  locations: Fürstenfeldbruck, Esting, Mammendorf.

The vehicle detects that the reference to exit 78 and the road designation "B471" are correct, but that the references to the road "B2" and the locations stated are missing in the navigation system. Any missing or incorrect information is assessed and is possibly stored in the data of the navigation system, in particular on an integrated hard disk, with the result that it can be displayed the next time. The following further actions can be carried out:
  incorrect details are corrected if possible,
  missing details are added according to importance and according to available storage space. In this case, road names are more important than place names and the place names mentioned first are more important than the place names mentioned last, for example,
  stored data are regularly cleaned up in the navigation system. If the available storage space is smaller than a threshold xmin, so many of the least important items of information are deleted until the available storage space reaches a limit xmax.

At the same time, it is possible to acquire even secondary data, such as the time needed on a particular section, in order to compare them with the predictions of the navigation system and to correct the map, if necessary. A map update can therefore be carried out on the basis of evaluated camera data.

Scenario 3: Inform Vehicles of Imminent Maneuvers

The navigation system announces an imminent turning maneuver. The vehicle uses a sensor to detect that it is not yet in the correct lane. A mechanism, for example car-to-car communication or a telematic back-end, is used to transmit the message indicating that the vehicle will shortly carry out a lane change and what type of turning maneuver will shortly be carried out. Other vehicles receive the message. Vehicles traveling in a completely autonomous manner may leave space for the lane change, if necessary, and/or may reduce the speed, depending on the detected traffic situation and dangerous situation.

Scenario 4: Automatically Carrying Out Maneuvers

The navigation system announces an imminent turning maneuver. The vehicle sets the corresponding turn signal and suitably reduces the speed. A lane change is carried out, if necessary.

Scenario 5: Alertness Assistant

The navigation system announces a maneuver, for example "Turn right in 200 m from the two-lane country road at 100 km/h to a single-lane village road which allows only 50 km/h 150 m after the turn". The vehicle uses at least one sensor to detect when corresponding maneuvers are carried out by the vehicle driver. If the speed is not reduced, the turn signal is not set and/or the lane is changed very shortly before the exit, for example, this can indicate fatigue of the vehicle driver. Changes in the reaction times of the vehicle driver are measured over the traveling time. A warning can be given if there is a deterioration.

Scenario 6: Map Updates

The deviations from the map which are mentioned in scenario 2 and need not be restricted to signposts but may also relate to the course of roads or the existence of further secondary roads are reported to a back-end server by the vehicle at regular intervals. The deviations can be validated and weighted there and can then be input to the stored map data which are loaded into other vehicles, for example. Vehicles can in turn request the current data from the back-end at regular intervals and can bring their own map data up-to-date.

Scenario 7: Individual Adaptation of Information

Depending on the existing restrictions of the vehicle driver, indications of turning information can be changed or adjusted in the following manner:
notification time,
special equipment such as further lights in the interior which indicate a maneuver; or graphical operating elements in the combination instrument, the central information display (CID) or the head unit (HU).

Within the scope of an open architecture of the navigation system, it is easy to integrate these elements using the listener concept mentioned without making changes to the navigation system itself and, in particular, to its complex components.

Scenario 8: Automatic Reduction of ACC Speed

The navigation system announces a maneuver. The ACC can automatically reduce the maximum speed set before a turning maneuver in order to adjust the vehicle directly to the then applicable maximum speed, for example upon exiting a freeway. The driver would usually brake and would therefore deactivate the ACC. The stored speed can be reduced. Depending on the deceleration behavior of the ACC during such maneuvers, braking by the driver would possibly no longer be necessary. The turning maneuver can then be carried out easily on the basis of the automatic speed reduction without the involvement of the brake pedal. When driving onto a higher-grade road, the maximum speed set can likewise be increased.

Manually increasing the speed by pressing on the gas pedal usually does not change the speed set in the ACC. This is used for temporary overtaking maneuvers, for example. When driving onto a freeway, triggered by a navigation event, the pressure on the gas pedal may simultaneously result in the ACC speed being adjusted.

The described apparatuses and system components are controlled, in particular, using computer programs and, for this purpose, may have further elements of computers and digital control devices which are known per se, such as a microprocessor, volatile and non-volatile memories, interfaces etc. The invention can therefore also be entirely or partially implemented in the form of a computer program or a corresponding control program module or a computer program product which entirely or partially effects a sequence according to the invention when loaded and executed on a computer. It may be provided, for example, in the form of a data storage medium such as a CD/DVD or else in the form of one or more files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a navigation system in a vehicle, in which navigation data from the navigation system are transmitted to at least one of a plurality of control apparatuses of the vehicle, the method comprising the acts of:
transmitting the data via at least one data bus to which the control apparatuses are connected;
prioritizing the navigation data, wherein
the transmission of the navigation data via the data bus is controlled on the basis of the prioritization,
wherein data relating to a current geographical position and relating to a current speed are given a higher priority than maneuver data and geographical data relating to a route.

2. The method according to claim 1, wherein a plurality of data buses are provided for transmitting the navigation data.

3. The method according to claim 1, wherein the navigation data are output only once to the at least one data bus and/or a further data bus by the navigation system within a predefined output time window.

4. The method according to claim 3, wherein the navigation data are output to the data bus in order of their assigned hierarchy within the output time window.

5. The method according to claim 3, wherein at least one of the connected control apparatuses of the vehicle stores the navigation data output only once to the data bus within the output time window for a predefined period and/or in a list with a limited storage size.

6. The method according to claim 1, wherein navigation data are stored in a navigation data list and the control apparatuses retrieve the navigation data.

7. The method according to claim 1, wherein, when outputting the navigation data, the navigation system outputs a report stating that data have been output.

8. The method according to claim 7, wherein:
reference data relating to the control apparatuses are stored in an output list, and
the navigation system uses the reference data to inform the respective control apparatuses of the respective output of the navigation data.

9. The method according to claim 1, wherein the navigation data are provided by the navigation system as binary-coded data and/or as text data.

10. The method according to claim 1, wherein the navigation data are at least partially provided as category data, at least one of the following categories being provided:
    an imminent driving maneuver,
    a driving maneuver which has been carried out,
    a measured value,
    a report.

11. The method according to claim 1, wherein maneuver data for carrying out a driving maneuver at a maneuvering location are output by the navigation system, and at least one vehicle sensor and position data provided by the navigation system are used to check, even before reaching the maneuvering location, whether the maneuver has been initiated with the vehicle, and a report is output if the maneuver has not been initiated.

12. The method according to claim 11, wherein maneuver data for carrying out a driving maneuver at a maneuvering location are output by the navigation system, and at least one vehicle sensor and position data provided by the navigation system are used to check whether navigation data stored in the navigation system match corresponding data recorded by the vehicle sensor in the vehicle environment, and the navigation data are adapted to the recorded data if there is a discrepancy.

13. The method according to claim 1, wherein maneuver data for carrying out a driving maneuver at a maneuvering location are output by the navigation system, and position data provided by the navigation system are used to output control signals to a vehicle actuator which changes a vehicle state and/or to a data output device of the vehicle.

14. A method for operating a navigation system in a vehicle, in which navigation data from the navigation system are transmitted to at least one of a plurality of control apparatuses of the vehicle, the method comprising the acts of:
    transmitting the data via at least one data bus to which the control apparatuses are connected;
    prioritizing the navigation data, wherein
    the transmission of the navigation data via the data bus is controlled on the basis of the prioritization,
    a minimum throughput is reserved on the data bus for transmitting the navigation data, and
    the minimum throughput is used to transmit the data in a prioritization order.

15. The method according to claim 14, wherein data relating to a current geographical position and relating to a current speed are given a higher priority than maneuver data and geographical data relating to a route.

16. The method according to claim 14, wherein the following high-priority navigation data are provided for the minimum throughput:
    current geographical position,
    current speed, and/or
    current position with respect to a traveled route.

17. The method according to claim 16, wherein the minimum throughput contains a predefined maximum data volume for low-priority navigation data and/or navigation messages which are assigned a lower priority than the high-priority navigation data.

18. The method according to claim 17, wherein a low-priority navigation message comprises a plurality of partial messages with the following contents:
    current relative position within a stipulated route in a geographical distance dimension,
    type of maneuver at the current position, and/or
    further information relating to the current position and/or relating to its environment.

19. A control system for operating a navigation system in a vehicle, in which navigation data from the navigation system are transmitted to at least one of a plurality of control apparatuses of the vehicle, the control system comprising one or more processors and associated memory configured to execute a program to:
    transmit the data via at least one data bus to which the control apparatuses are connected;
    prioritize the navigation data, wherein
    the transmission of the navigation data via the data bus is controlled on the basis of the prioritization,
    wherein maneuver data for carrying out a driving maneuver at a maneuvering location are output by the navigation system, and at least one vehicle sensor and position data provided by the navigation system are used to check, even before reaching the maneuvering location, whether the maneuver has been initiated with the vehicle, and a report is output if the maneuver has not been initiated.

20. The method according to claim 19, wherein data relating to a current geographical position and relating to a current speed are given a higher priority than maneuver data and geographical data relating to a route.

* * * * *